United States Patent [19]

Reip

[11] 4,410,005
[45] Oct. 18, 1983

[54] PILOT OPERATED RELIEF VALVE

[75] Inventor: Raymond G. Reip, Indian Head Park, Ill.

[73] Assignee: Vapor Corporation, Chicago, Ill.

[21] Appl. No.: 483,851

[22] Filed: Apr. 18, 1983

Related U.S. Application Data

[63] Continuation of Ser. No. 233,376, Dec. 13, 1981, abandoned.

[51] Int. Cl.³ .............................................. F16K 31/38
[52] U.S. Cl. ...................................... 137/488; 138/44
[58] Field of Search ............ 137/488, 489, 492, 492.5; 251/29; 138/42, 43, 44

[56] References Cited

U.S. PATENT DOCUMENTS

| | | | |
|---|---|---|---|
| 3,013,583 | 12/1961 | Stanley | 138/43 |
| 3,771,553 | 11/1973 | Huet | 137/488 |
| 4,200,119 | 4/1980 | Cunningham | 138/45 X |

Primary Examiner—Alan Cohan
Attorney, Agent, or Firm—Francis J. Lidd

[57] ABSTRACT

A pilot operated relief valve for use on medium and high pressure vessels, conduits, and the like.

A two-stage, non-flowing valve (5) operates a main relief valve (7) of substantially greater capacity. Flow control elements provided by (35), (36), (38), and (39) associated with the first stage poppet are utilized to provide positive valve operation. In a preferred embodiment the main valve is mounted directly onto the pressure vessel which is to be vented at a predetermined pressure. The pilot is preferably mounted closely adjacent to and in fluid communication with the main valve. A flow adapter (100) having a self-cleaning orifice is disposed intermediate said main valve head volume (68) and pilot vent port (1) to provide improved operation of the combination. A ball (16) selector, (24, 15, 76) provides means for conveniently connecting to a field testing either the pilot or the entire valve, providing improved setpoint and reset or blowdown adjustments for the overall combination.

1 Claim, 9 Drawing Figures

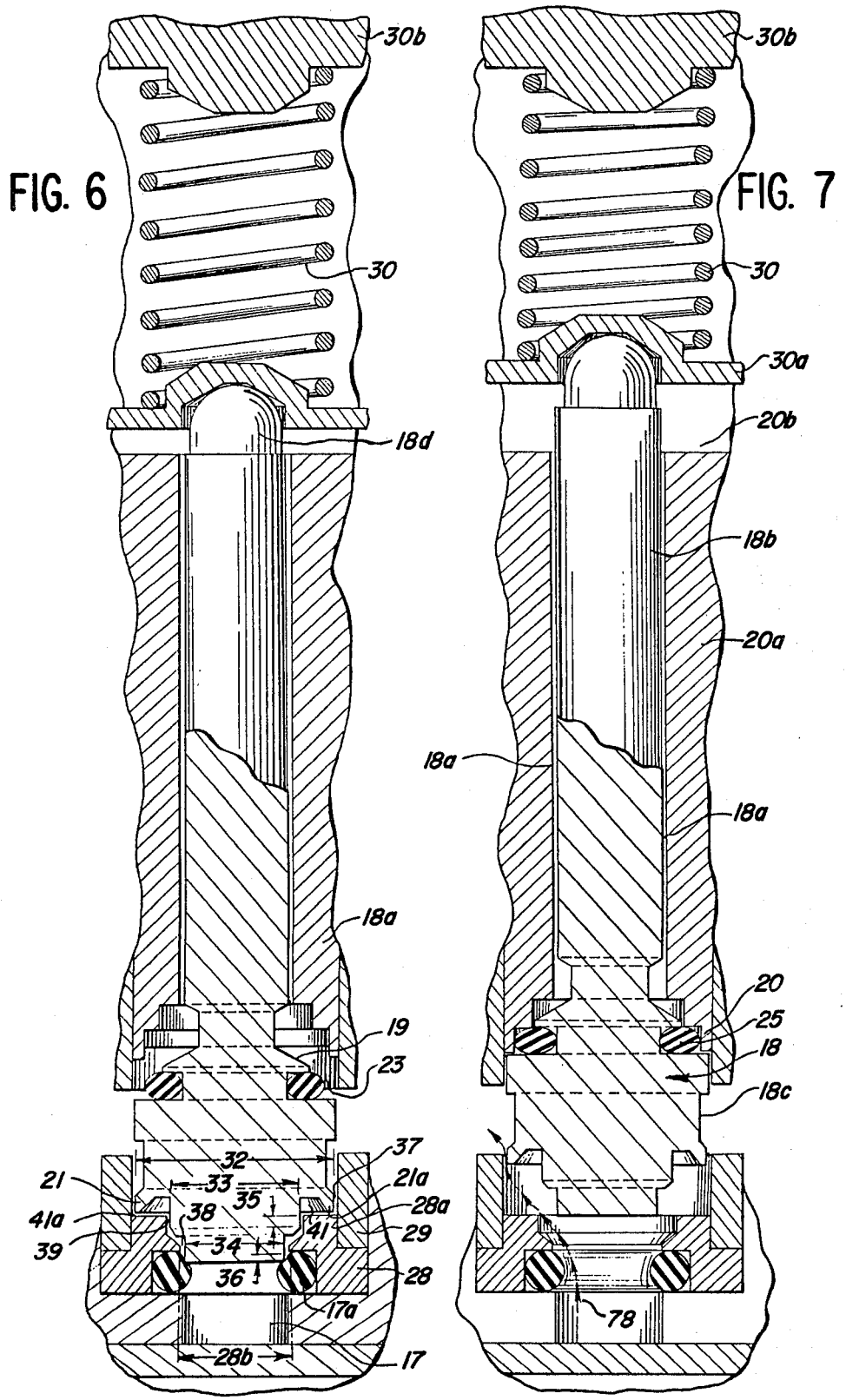

PILOT OPERATED RELIEF VALVE

This application is a continuation of application Ser. No. 06/233,376, filed Feb. 13, 1981 now abandoned.

BACKGROUND OF THE INVENTION

This invention relates generally to pressure operated relief valves and more particularly concerns a novel two-stage pilot valve having substantially larger capacity at predetermined pressures. Specifically, the valve disclosed provides improved main valve operation through control of pressure dynamics of the combination pilot, main valve and associated pressure conduit or vessel. An improved method of calibrating and testing pressure sensitive elements is also provided.

Prior art relief and/or valve combinations are disclosed in U.S. Pat. Nos. 3,595,263, 3,664,362, 3,512,560, and 3,568,706. However, although the operation provided by these combinations of main and pilot valves is acceptable, adequate control of the dynamic relationships between the pilot valve, main valve, and pressure vessel or conduit is difficult to achieve. In addition, the prior art valves, in many cases, when tested on site, provide a method of testing only a pilot valve set point. Therefore, reset or blowdown pressure setting of the pilot valve and the main valve operation remain untested. The pilot valve disclosed herein provides for on site testing of pilot set point, blowdown, or reset pressure, and main valve, or alternately the pilot valve alone, through the use of small quantities of an auxiliary test gas.

Therefore, it is an object of the invention to provide an improved two-stage pilot valve for operation of a larger capacity pressure relief valve wherein test operation of the first stage pilot is possible without operation of the main valve.

It is an object of the invention to provide a pressure relief valve of substantial capacity having improved control of the product flow and pressure dynamics associated with the pilot valve, main relief valve, and pressure vessels or conduits requiring pressure relief.

It is a further object of the invention to provide an improved two-stage pressure sensitive pilot valve, wherein flow of the product, exerting the sensed pressure, through each stage of the valve occurs only during relief or reset operation of the pilot.

It is still a further object of the invention to provide a two-stage pressure operated pilot valve for operating main relief valves of substantially larger capacity where greatly reduced flow through the pilot can be highly filtered providing increased reliability through a reduction in contamination.

SUMMARY OF THE INVENTION

The pressure operated relief valve disclosed here employs mechanically independent first and second pressure operated stages. In a typical embodiment, the two-stage pilot valve operates a substantially larger main valve by venting the main valve head volume to ambient pressure. The design of the main valve is such that prior to the relief valve venting, the main valve closure member or piston is in pressure equilibrium with the tank or pressure vessel. When the head volume above said piston is vented to atmosphere, the tank pressure is utilized to lift the piston and open the main valve providing the desired pressure relief. An additional pressure signal to the pilot valve is provided by a ram tube located adjacent to the tank and/or pressure vessel, which provides an indication of true tank or product pressure allowing the pilot and main valve to rest at a correct tank pressure independent to the magnitude of main valve flow.

A feature of the two-stage pilot valve disclosed is utilization of a specific storage volume to control the rate of change of pilot product flow between the first and second stages. These controlled rates of operation provide positive and more accurate relief and blowdown operations of both the pilot and main valve.

Additionally, the first, or pressure sensing stage of the valve disclosed, utilizes a novel pilot-seat relationship incorporating pressure and flow sensitive elements. These elements provide improved control of poppet lift and blowdown or reset forces, resulting in accurate valve response to preset relief and blowdown pressures.

An additional advantage provided by the invention disclosed involves the use of a unique ball selector which allows testing of the pilot valve stages from an independent and/or calibrated source of pressurized gas. Introduction of test gas at pressures higher than the storage tank pressure automatically isolates the pilot first stage from the normal product, thereby confining test pressure to the pilot valve alone. On subsequent reduction of the test pressure, pilot action is such that the test connection is automatically closed off and product pressure restored to the pilot, allowing testing equipment to be disconnected without the loss of tank or product pressure.

BRIEF DESCRIPTION OF THE DRAWINGS

Other objects and advantages of the invention will become apparent when reading the following detailed description and upon reference to the drawings, in which:

FIG. 6 is a partial section of the pilot valve first stage showing a poppet assembly in a closed or non-venting position, and particularly showing the relationship of pressure sensing elements on the poppet in relationship to the first stage seat.

FIG. 7 is a further partial section of the first stage pilot valve showing the poppet assembly in an open or flowing position, and particularly showing the relationship of the blowdown or reset elements on the poppet and their associated seats.

DETAILED DESCRIPTION OF THE INVENTION

Figure 1:
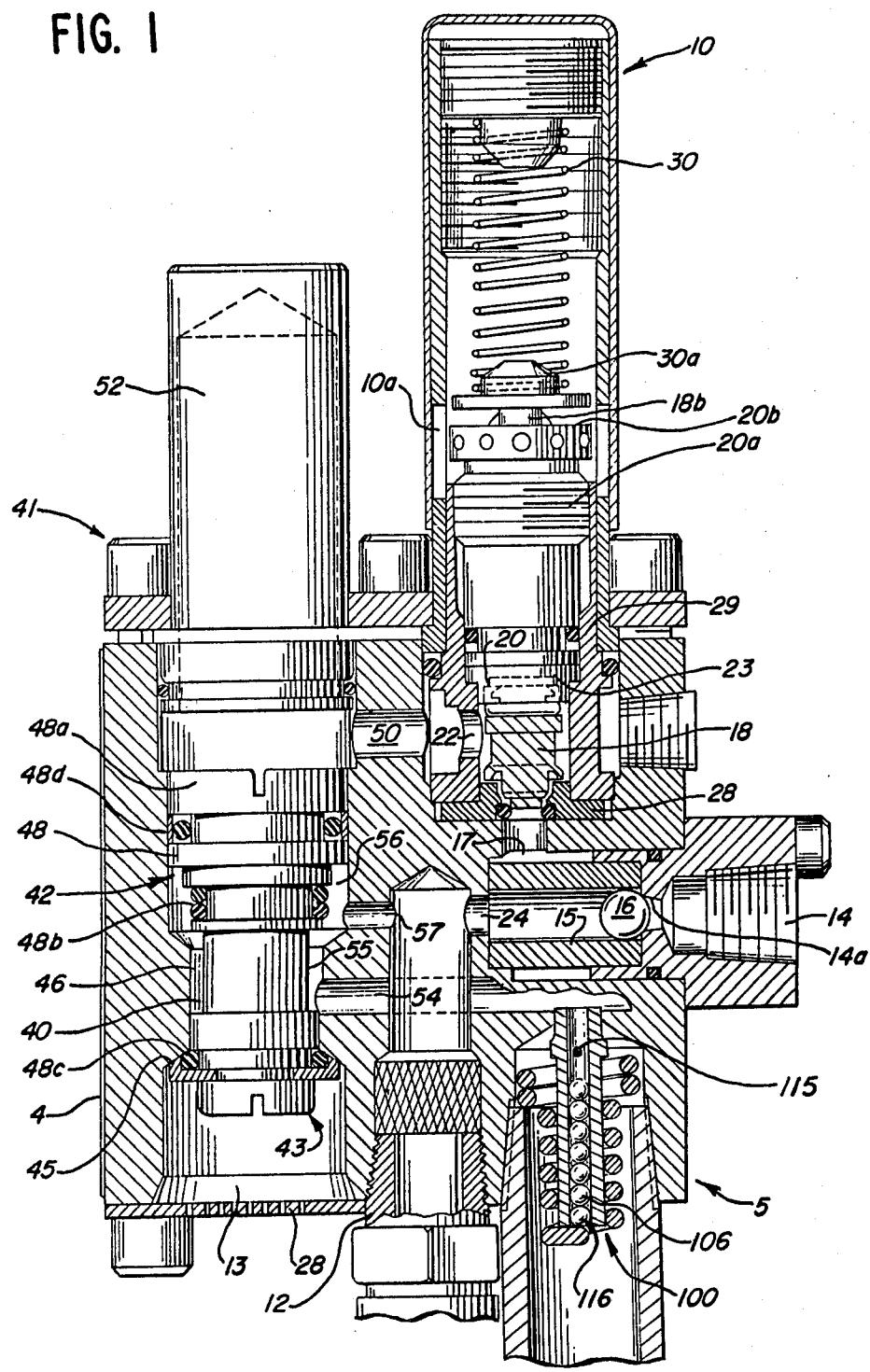
FIG. 1 is a sectional view of the pilot valve showing the first and second stages, ball selector and associated internal porting. Main valve and pressure source ports are also shown.
Figure 2:
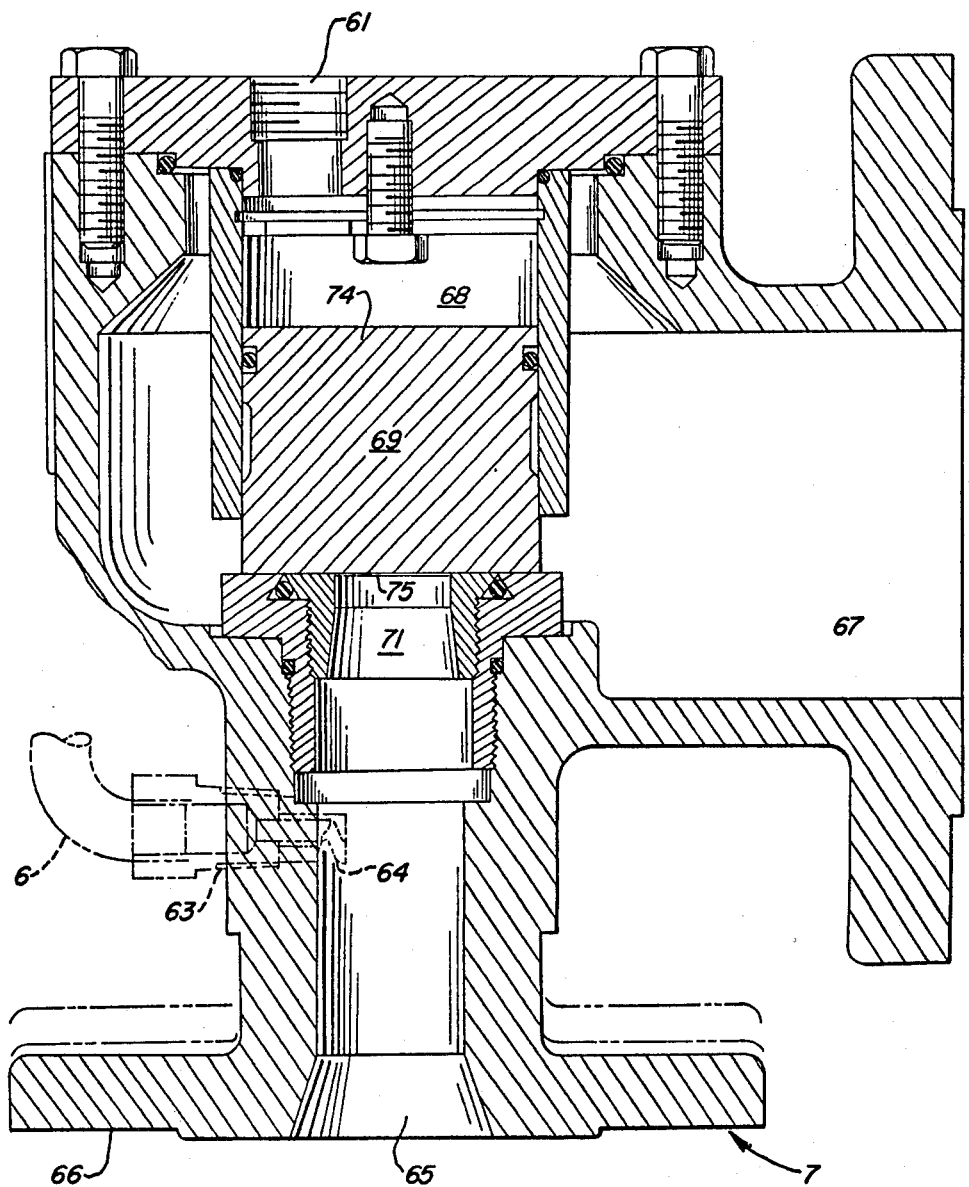
FIG. 2 is a sectional view of the main valve portion of the invention including tank, conduit, or pressure relief vessel inlets, and showing the pilot tube, main valve head port and pilot valve connecting tube.
Figure 3:
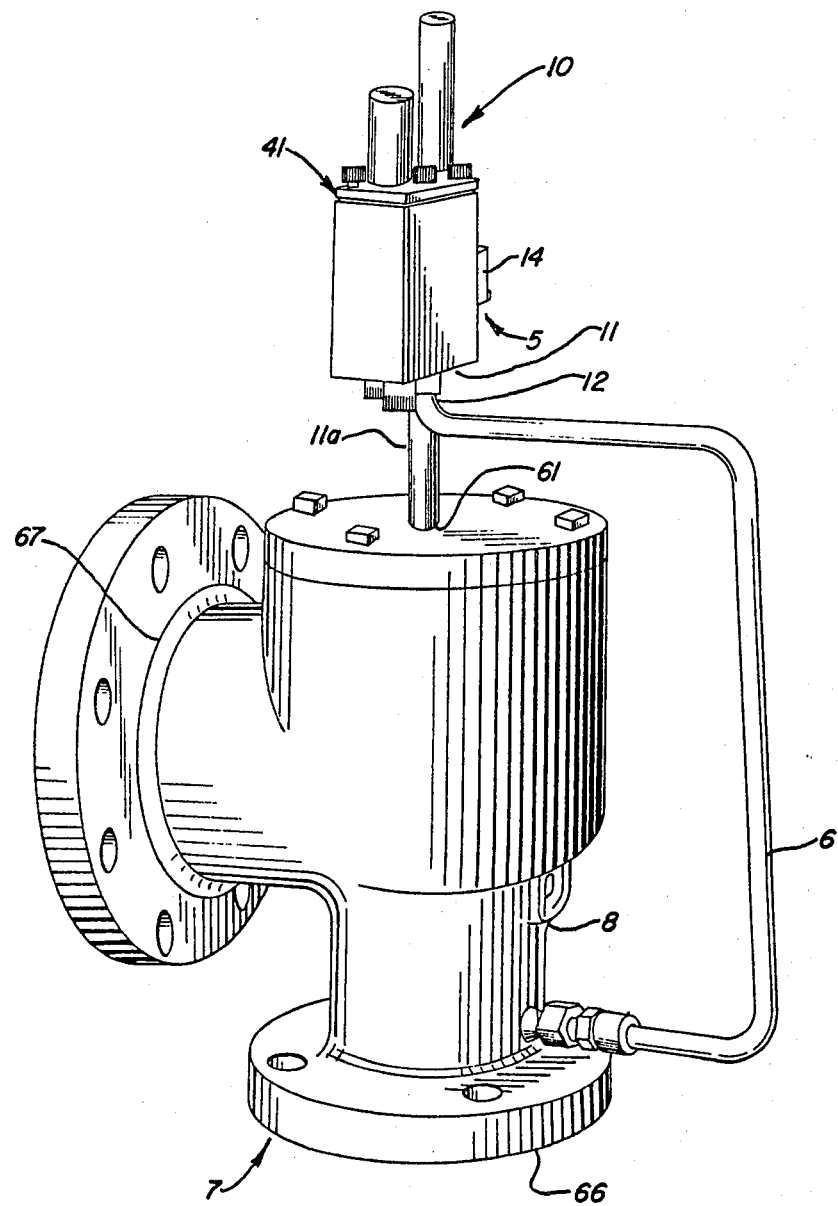
FIG. 3 is a semi-pictorial view of the pilot operated relief valve in a preferred but not exclusive embodiment wherein the two-stage pilot valve is mounted closely adjacent to the main valve. Also shown is the ram tube tap, connecting tube and its associated pressure tap just above the main valve inlet port.
Figure 4:
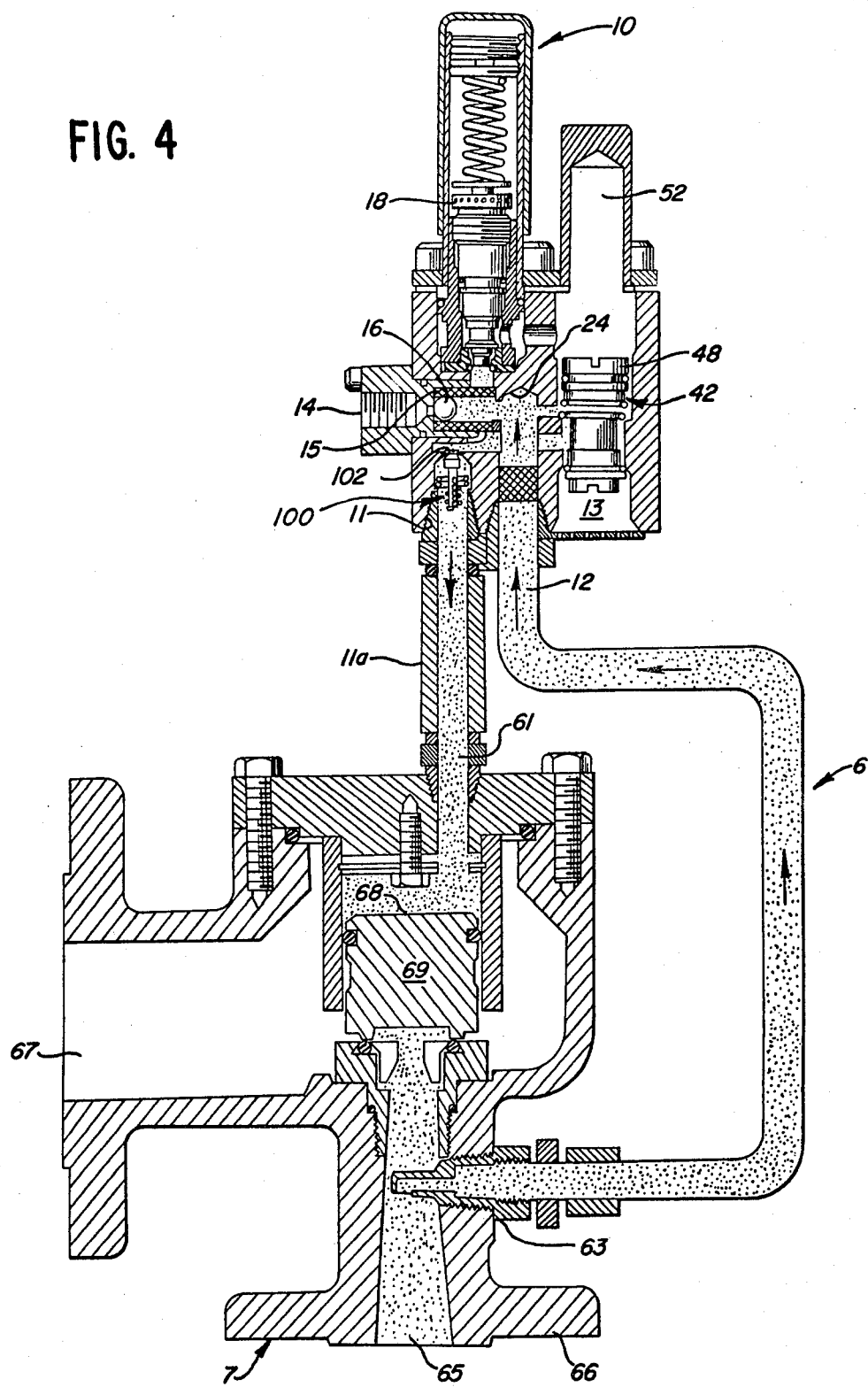
FIG. 4 is a sem-pictorial flow diagram showing in cross section, essential innerconnection of the pilot and main valves. Valve components are shown in the normal or non-venting stage.
Figure 5:
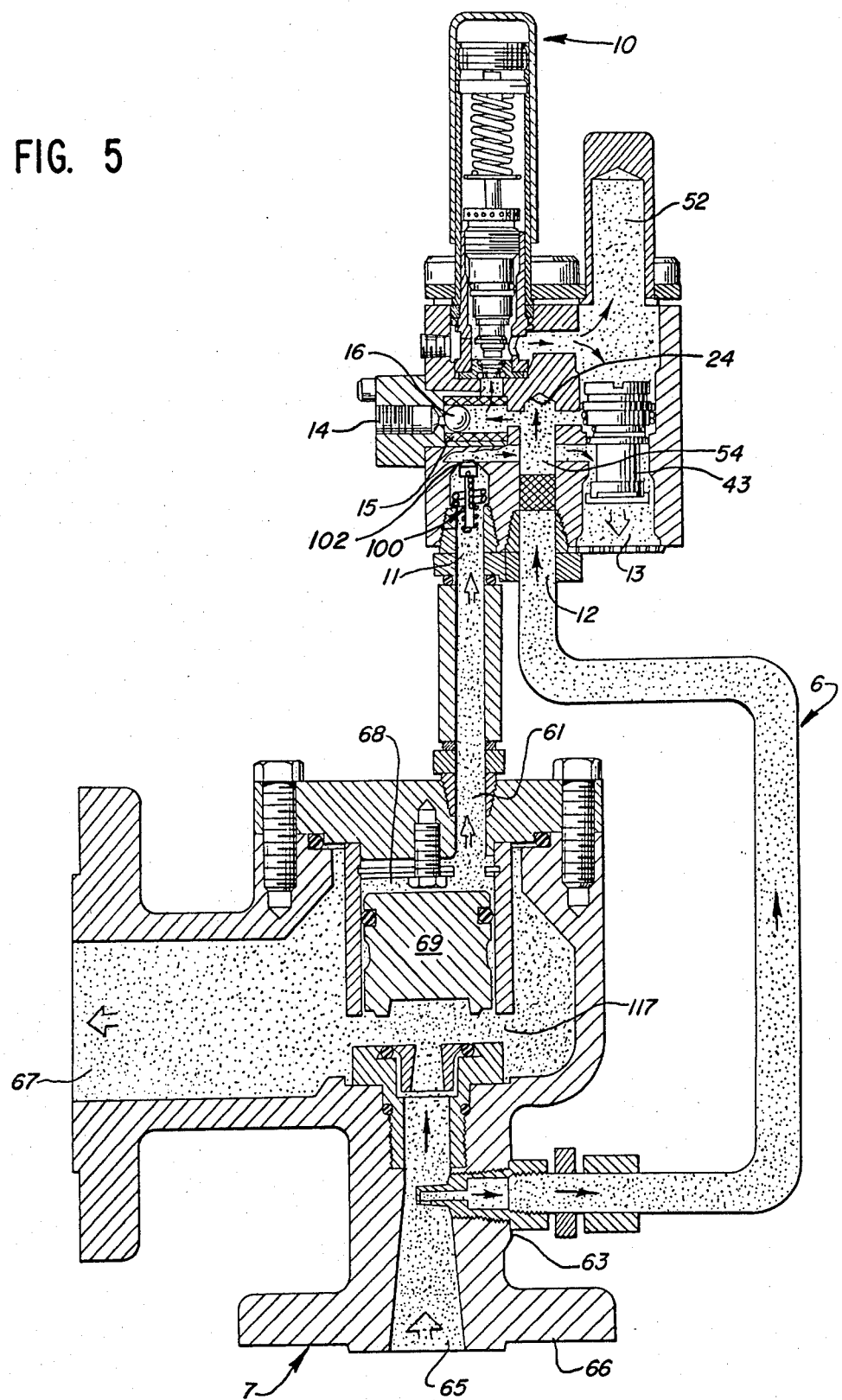
FIG. 5 is a semi-pictorial flow diagram similar to FIG. 4, showing with valve components in the venting or relief state.

In reference to FIGS. 1 and 2, the pressure operated relief valve disclosed here consists of a pilot valve generally shown as 5 (ref. FIG. 1), having a first stage 10 and a second stage generally shown as 41 contained in a body 4. In a preferred embodiment the pilot is mounted closely adjacent to the upper end of a main valve 7 (ref. FIGS. 2, 4, and 5) communicating with the pilot through main valve head port 61 and main valve head pressure and vent port 11 of the pilot valve. In the disclosed embodiment a pipe or conduit 11a connects 61 and 11 (ref. FIG. 3). Additionally, (ref. FIGS. 3, 4, and 5) there is an inner-connecting external pressure tube 6 further communicating pilot valve tank pressure sensing or inlet port 12, with a pressure tap 63 contained in the lower portion of the main valve 7 just above the main inlet flange 66 and inlet 65. The pressure tap 63 communicates with a total pressure or ram tube 64, providing tank pressure inputs to the pilot prior to pilot operation and during main valve flow. Typically, the lower flange 66 of the main valve is mounted on an opening in or communicating with a pressure vessel or conduit. Operation of the pressure operated relief valve therefore vents the vapor and/or gaseous product contained in the above mentioned pressure vessel or conduit through the main valve 7.

In operation, assuming that tank vapor and/or gas pressure is below the first stage relief setting or valve, determined by the preload of adjustable compression spring 30, as shown in FIGS. 1, 2, and 4, static vapor pressure from the associated vessel or conduit is applied to the main valve piston and/or seat area 68 through the port 65, pressure tap 63, ram tube 64, and pilot valve via tube 6, pressure inlet port 12, and a second stage tank and/or pressure inlet port 57, second stage plunger bores 55 and 56, second stage main port 54, port 11, and conduit 11a. Pressure is further communicated inside the pilot valve (ref. FIG. 1) to the first and second stage elements via port 57, pilot valve first stage cross port 24, first stage inlet port 17, and filter 15. Therefore, product pressure is exerted on the first stage poppet assembly 18 over the area defined by the first stage inlet seat, or port 17 and poppet piston lower face area 34 (reference FIG. 6). Filter 15 communicates test port 14a and 24 directly, defining a guide for ball closure member 16. Ball 16 seats on either port 14a or 24, as will be discussed later. Filter 15 also communicates ports 24 and 14a with port 17, through its filter media.

As shown in FIG. 1 and in greater detail in FIGS. 6 and 7, the first step poppet assembly 18 coacting with first stage seat 28, utilizes flow and pressure sensitive elements. These elements include a piston 18c, and a shoulder or blowdown member 19, adjacent to the piston. A first stage blowdown seat 20 coacts with a first stage poppet seal 25, located concentric with and intermediate the shoulder 19, and piston 18c.

The poppet assembly 18 further includes a poppet valve stem 18b, mounted internal of and concentric with poppet guide and blowdown seat retainer 20a, for reciprocal motion therein. The lower end of 20a defines the above mentioned blowdown seat 20. It should be noted that the upper end 18d of the poppet valve stem 18b is at all times in contact with the lower lift spring retainer 30a. Spring retainer 30a does not contact the upper surface 20b of the poppet guide 20a, allowing relative motion therebetween. The clearance or space provided between the retainer 30a and surface 20b allows compression of poppet lift spring 30 as to provide individual adjustment of poppet lift (i.e. travel) and reset forces on the poppet stem 18b produced by spring 30.

The poppet guide/blowdown seat retainer 20a is further mounted internal of and threadably engaged within an extended portion of the poppet seat retainer 29. The threaded engagement and the above mentioned relative motion between 18c and 20d provides vertical adjustment for the blowdown seat 20. This construction allows independent adjustment of the lift, or travel and lift off force of the poppet assembly 18 during relief operation. Also the first stage poppet and seat incorporate specific annular clearances utilized to provide reliable and repeatable poppet operation. These clearances include peripheral clearance between first stage poppet reaction lip 21, outer piston diameter 32, and inner diameter of the seat retainer 29, i.e., clearance 37; first stage poppet second or intermediate closure section outer diameter 33 and seat 28 inner diameter, i.e., clearance 39. An additional clearance 38 is defined by the outer diameter or 34 of the initial closure section of piston 18c, and inner diameter 28b of seat 28.

Also associated with the above clearances are overlaps of the first stage poppet piston first or relief closure section (pressure sensing) at outer diameter or 34, i.e., 36, and first stage poppet closure member second or intermediate closure section/seat overlap 35.

The second stage valve 41 (ref. FIGS. 1, 4, and 5) comprises a second stage plunger assembly 42, having plunger or second stage closure member 48 reciprocating in a bore 40 having first and second diameters 55 (lower) and 56 (upper). Plunger 48 has an upper end 48a, and operating seals 48b and 48c. The seal 48d of the poppet assembly allows the plunger assembly 42 to reciprocate in bore 40 in response to pressure differentials above and below the plunger. The assembly 4 also incorporates a plunger lower seat retainer 43, and a poppet seal 48c.

Operation of these elements during first stage poppet lift off and blowdown will be described in detail below.

When connected, as shown in FIG. 4, with product pressure less than that required to lift first stage poppet assembly 18 the design of the second stage poppet assembly 42 and differential areas associated with the second stage closure member or plunger 48 maintain the second stage poppet assembly 43 as shown (Ref. FIGS. 1 and 4 in its non-venting position sealing against lower seat 45. Since product pressure acts on second stage plunger assembly 42 below seal 48d, and first stage piston 18c is in contact with its seal 17a, isolating second stage plunger upper end 48a from said pressure, plunger 48 is held in the upper diameter 56 of plunger bore 40 defining an annular head pressure passage and/or pressure sensing ports consisting of upper bore 56, and lower bore 55, and passages 54 and 57. Enclosed volumes associated with bores 55 and 56 and adjacent plunger sections define first and second annular chambers associated with venting or relief and non-venting positions of the plunger 48 in the bore 40. A first chamber is defined by the plunger diameter and bore above the seal 48c when coacting with seat 45. A second chamber is defined by the plunger diameter and bore above the seals 48b when coacting with the bore seal area 46 in the relief or venting position.

As will be discussed later in more detail, the plunger 48 and seals 48b, 48c coact with bore seal region 46 and vent seal seat 45 to selectively seal or vent the main valve head volume 68 for first and second positions respectively of the plunger 48.

Under non-venting conditions, tank pressure acts on upper and lower surfaces of the main valve piston 69, through port 11 of the pilot valve and ports or passages 54, 55, 56, and 57 as discussed above. As main valve effective area 74 is greater than the main valve closure member area 75 of piston 69, the piston remains in the seated or closed position, and no venting of the tank occurs.

Tank or product pressure is sensed through the main valve inlet 65 (reference FIGS. 4 and 5). The relief pressure setting of the pilot valve first stage is determined by the force pre-load of compression spring 30 and associated spring retainer 30a, 30b, contained in the pilot valve first stage (reference FIGS. 6 and 7). When product pressure increases beyond the predetermined or calibrated setting, force exerted on the first stage poppet by product pressure at the effective area of first stage initial closure section at diameter 34, acting through first stage inlet port 17, filter 15, port or seat 24, and inlet port 12, raises the poppet 18, thereby opening the first stage inlet 17 and allowing product flow through discharge 22 in the first stage seat retainer 29, and passage or port 50 interconnecting first and second stages. Product pressure now acts on the upper end 48a of plunger assembly 42.

Improved operation of the novel first stage poppet disclosed herein results from utilization of flow control elements and contained on the poppet assembly 18 and more particularly the piston 18c. Operation of this design in relief is as follows; when as indicated above, tank pressure acting on the area associated with initial closure section diameter 34, exceeds the force of the adjustable spring 30, the poppet piston 18c, initially sealing the first stage inlet port or orifice 17 through interface distance 36, adjacent to piston diameter with the seal 17a, begins to move in a vertical or upward direction. At this point, since poppet-seat clearance 38 is greater than the clearance at 39, when the seal between interface 36 and seal 17a is broken, product flow through 38 and 39 is essentially controlled by annular passage or overlap length 39. Additionally, since the overlap 35, associated with clearance 39, is greater than the overlap 36, the clearance 39 controls product flow now initiated through poppet-seat clearance due to poppet movement. Flow control by clearance 39, and overlap 36 is due to concurrence of the greatest product flow resistance at the restriction provided by those elements.

Product flow through 38 and the resultant pressure drop across clearance 39 produce an additional upward force due to the increased area associated with diameter 33 of the poppet piston or second closure section. Additional pressure drop due to flow controlling clearance 39, continues until overlap 35 approaches zero, providing a steadily increasing upward force due to additional pressure acting on the lower surfaces of the piston reaction lip at diameter 32, that is, under the reaction lip 21 as shown by flow indicator arrow 78. The annular chamber 41 defined by reaction lip 21, and closure member second section diameter 33, provides additional improvement in relief operation since the clearance 41a between the lip circumferential edge 21a and annular seat surface 28a provides controllable resistance to radial product flow in 41a at the time of lift off. This characteristic allows better utilization of the flow control design utilized in the above mentioned poppet closure member.

In the preferred but not limiting embodiment discussed above, clearance 38 is greater than 39, and overlap 35 is greater than overlap 36.

As distinguished from the prior art poppet designs this construction provides steadily increasing lift forces on the poppet during relief, providing reliable poppet lift operation without recycle. Without the above mentioned design, initial poppet lift off would result in rapidly decreased pressure drop, through the poppet-seat clearance, resulting in loss of sufficient vertical lift forces on the poppet 18 and successive reclosure or chattering of the member or partial opening with excessive simmering or pre-leakage. Under these conditions it would be necessary to allow tank pressure to raise substantially above the relief setting before poppet instability is overcome to achieve complete poppet action and relief valve operation. A chattering, or simmering poppet has been shown to result in unsatisfactory relief valve calibration, and shortened valve life.

It should be noted that during the above described poppet lift off operation and vertical travel, at all times, predetermined product flow occurs through the poppet stem (18b) guide (20a) clearance 18a to the atmosphere, through passages 10a in housing 10, and leaks in any succeeding dust cover (not shown), as well as through the poppet discharge orifice 22. A further novel aspect of the first stage disclosed herein is the complete shut-off or product flow through 18a by seal 25 and seat 20 when the poppet achieves its relief or flow location as shown in FIG. 7.

As discussed above, operation of the second stage poppet assembly 42 is such that on first stage relief operation or lifting of poppet assembly 18, from a set pressure position on seat 28, the second stage plunger or closure member 48, with tank pressure exerted on its upper end through inlet port 50, is forced to a position where the second stage plunger 48, and seals 48b move vertically downward in the bore 40 until they seal against the bore seat region 46 of the second stage bore lower diameter 55 of the second stage plunger operating bore 40. Plunger movement also moves seal 48c from seat 45.

At this time, Ref. FIG. 5, the main valve head volume 68 vents to the atmosphere through passages 54, 55, bore 40, and screened vent 13. Also with the plunger 48 in its venting position, venting orifice or passage 56 is closed off by action of the seals 48b, acting at bore seal area 46, thereby terminating fluid communication between the vented tank or vessel and main valve head volume 68 through passage 57. More importantly, isolation of port 57 eliminates product flow via ram tube 64, tube 6, and pilot inlet 12 during venting. Since pressurizing volume 68 of the main valve and operating piston is accomplished by venting volume 68 through the second stage 41, as discussed earlier, product flow through the pilot valve first stage is limited to short periods of poppet and plunger motion.

Tank pressure is now sensed by pilot first and second stages through first stage port 12, tube 6, pressure tap 63, and ram tube 64.

When venting through port 13 and poppet action to be discussed below causes the pressure above the main valve closure member 69 and area 74 to drop to a value substantially less than that exerted on the lower area 75, the closure member or shut-off piston 69 rises allowing the tank product to vent via flow passages 65, 71 and vent to the atmosphere through outlet 67 (Ref. FIG. 2).

During venting, as indicated above, total pressure of the vented tank or conduit is now supplied to the ram or pilot tube 64, located in the main valve at 63, and communicates this pressure through the tube 6 and port 12 of the pilot valve thereby maintaining the second stage poppet assembly 42 in its depressed or relief position.

As discussed above, initiating a period of main valve head venting causes the second stage plunger or closure member 48 to "shut-off" or interrupt flow through port 57 after a very small amount of transient product flow. Therefore, the only flow of product through the first pressure sensing stage 10 is the amount required to operate the second stage 41, and to pressurize the volume above the second stage, including the volume 52 and other volumes inherently associated with the construction of the first and second stage combination. This small volume flow allows the use of a very fine filter 15 thereby reducing the amount of contaminated particles or materials entering the pilot valve. A low flow characteristic and filtering provide substantially increased overall valve reliability and retention of preset pressure settings.

When the product flow through the main valve 7 causes a reduction in tank or vessel pressure sensed by the ram tube 64 to a value where the first stage pilot set point spring 30 exerts sufficient force to begin downward movement of the first stage poppet 18, the seal 25 associated with the first stage poppet blowdown seat opens and allows a controlled amount of leakage from the first stage poppet chamber 23 through a clearance passage 18a between the poppet 18 and seat 20, as discussed above, to the atmosphere or ambient pressure. This action essentially regulates the decrease in pressure in chamber 23, thereby controlling the downward descent of the first stage poppet, since the leakage in effect increases the pressure differential occurring across the poppet 18c and the orifice 17. Reduction in product or vapor pressure in chamber 52 and associated internal volumes above the plunger surface 48a, and similar reduction in residual tank pressure acting through port 57 caused plunger assembly 48 to rise, resetting seal 45 against seat 48c.

It should be noted that without the controlled first stage poppet action described above, rapid motion of the poppet would result in transient closing of the orifice 17, and consequential transient reclosing or chattering of the second stage poppet, resulting in further and destructive transient operation of "chattering" of the main valve member 69.

As discussed above, blowdown and/or reset pressure is to a large degree controlled by the travel of the poppet assembly 18. However, reliable and accurate control of the internal transient pressures and the aerodynamic forces associated with poppet movement. Therefore, it is essential that the entire poppet/seat design, both pressure sensing and blowdown, be integrated to provide satisfactory operation.

The controlled descent of the first stage poppet is enhanced by the presence of a damping chamber 52 which supplies the working product or fluid during operation of first and second stage poppet and plungers to insure that the poppet leakage and transient pressures are consistent and predictable in nature.

It should be noted that the above predictable and controlled first stage poppet operation also occurs on lift-off, when the damping chamber 52 essentially bleeds off product flow through the orifice 17 by filling the chamber 52, again preventing "chattering" or mechanical transients with ensuing operation of the second stage and main valve.

The pilot valve disclosed herein provides controlled operation during the transient or operating phase wherein the first stage poppet and second stage plunger move from first to second position corresponding to set, relief and blowdown operation, through control of transient pressures occuring in the first and second poppet-associated volumes. These pressures are significant in providing operation. If the pressures decay too rapidly on blowdown or rise too rapidly on lift-off, valve operation will exhibit unwanted and damping oscillatory motion or chatter. However, as disclosed, through use of predetermined combinations of differential poppet areas, and associated volumes, the pressure reduction at a reduce rate is achieved resulting in positive and controlled downward movement of the first stage poppet and associated resetting of the second stage plunger.

An additional feature of the pilot valve (Ref. FIG. 1) disclosed is incorporation of a ball selector 16 located between the inlet pressure port 12, the cross port 24, and the field test inlet port 14. The ball selector is contained in a first stage filter 15, providing a guide for horizontal movement of the ball between ports 24, and an orifice seat 14a, defined by inlet port 14.

Field testing is accomplished by supplying air or other convenient medium, at a known pressure, to port or test point 14. With the tank product vapor pressure greater than the test medium, and below the first stage set or relief setting, action of the ball 16 in the inlet orifice 14a closes the pilot test connection by sealing orifice seat of 14a. On application of a test gas, when the applied test pressure reaches a value greater than the tank pressure provided through port 12 and tube 6, the ball 16 will move laterally internal of the filter 15, to close port 24, thereby isolating the product contained in the tank. Further increase of the test medium pressure will result in operation of the pilot and main valve without raising the tank pressure to its relief valve.

On reduction of the test pressure, ball 16 reacting to produce pressure through inlet 12, and port 24, moves to again close port 14a, thereby preventing inadvertent escape of product volume on removal of the test device from port 14.

As those skilled in the art will realize, the ball selector provides a convenient method of testing relief valve operation and relief set point without requiring an increase in tank pressure. This greatly reduces the volume of test gas required since only enough volume to activate the pilot is used, with the main valve operated by tank product.

Operation of the main valve can be prevented through use of a solid disk in place of the screen 28, thereby sealing off the second stage vent 13. With the disk in place, application of test pressure to port 14, as discussed above, isolates that tank from the entire pilot and continuing flow of test fluid, or product, supplied through 14 provides operation of the first stage without operation of the large main valve 7. It will be appreciated that this allows testing of the pilot without loss of product through the main valve.

Figure 8:
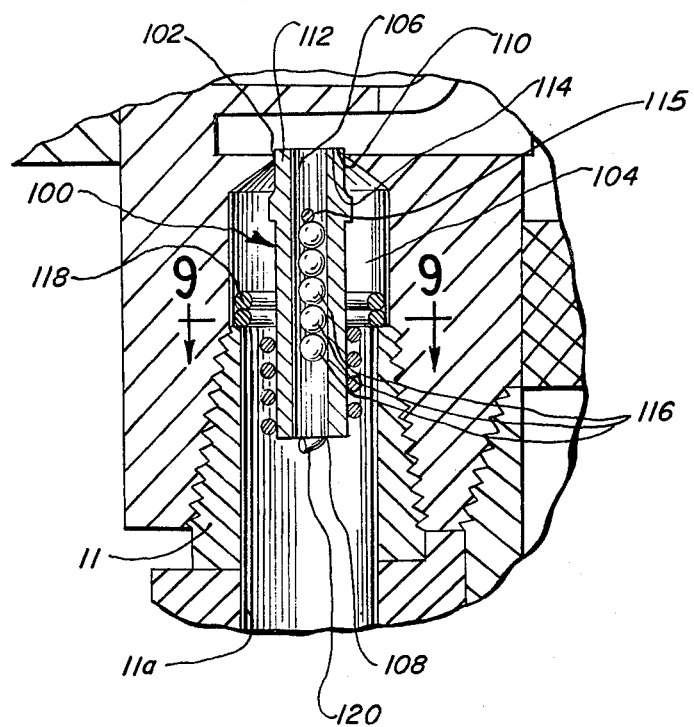
FIG. 8 is an enlarged view of the flow damper employed in the pilot valve of the present invention.
Figure 9:
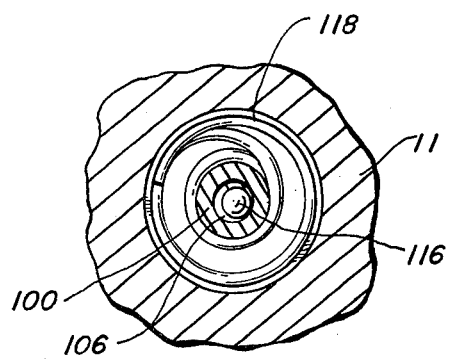
FIG. 9 is a view taken along line 9—9 in FIG. 8.

Referring now to FIGS. 4 and 5 and with particular reference to FIGS. 8 and 9, there is illustrated a flow adapter or damper generally designated by the reference numeral 100. In FIG. 4 the pilot-main valve combination incorporating the damper 100 is shown in a static or non-flow condition. Under these conditions the control balls or spheres 116 will be as indicated in FIG. 1, that is resting at the lower end of the central conduit 106. In FIG. 5, the aforementioned assembly is shown in the flow or venting position, wherein the flow control balls or spheres 116 occupy a position so that the uppermost ball abuts and is retained by a retainer pin 115, positioned transverse to the central conduit 106 at its uppermost end, i.e., opening 110. Flow control balls 116 are therefore retained in the bore 106 by a portion of the spring 120 at its lower end, and the pin 115 at its upper end. Product flow through the central bore occurs with excursions of the balls 116 within the conduit with motion limited by the aforementioned members 115 and 120.

As illustrated, (Ref. FIGS. 4 and 5) the flow adapter 100 is positioned between the two-stage pressure operated pilot 5 and the head volume 68 of the balanced piston 69 of the main valve 70. In this position, the adapter 100 functions to control the action of the main valve piston 69 by tending to restrict the flow of fluid both into and out of the main valve head volume 68 as it passes through the main valve head port 61.

With the adapter 100 in place, chattering typically found in prior art valves is prevented. Such chattering most often occurs in prior art valves as the main valve piston 69 closes, and is believed to be due to transient pressure changes occuring at the main valve inlet 65. These pressure transients are propagated through the connecting tube 6, thereby recycling the pressure sensitive elements of the pilot-main valve combination. Rapid motion of these elements produces further pressure changes, i.e., pulsations, resulting in additional mechanical forces on pressure surfaces and resultant valve chattering.

As best illustrated in FIGS. 8 and 9, the adapter 100 includes a damping plug 104 that is tubular in configuration with a central conduit 106 including a first 108 and second 110 openings. The second opening 110 is restricted at locations 112 and 114 by a cross-pin or ball retainer 115, contained by the upper end of plug 104 adjacent to the second opening 110. The remaining opening between the central conduit inner-diameter and the cross-pin is smaller than the diameter of any one of the plurality of balls 116 mounted within the central conduit 116, thereby retaining said balls at the upper end of the conduit 106.

As illustrated in the preferred embodiment, seven balls 116 are positioned in the conduit 106; however, this number may be varied depending on the amount of flow through the central conduit 106 that is intended to be restricted. As can be understood by one skilled in the art, the balls 116 define a consistent annular flow area, which cannot be restricted or clogged by a single dirt particle.

The balls 116 are of a smaller diameter than the diameter of the central conduit 106 and are free to move to some extent within the conduit 106. This freedom of movement of the balls 116 results in the adapter 100 being self-cleaning in that the movement of the balls 116 functions to clean the annular orifice space between the balls 116 and the conduit 106 of debris and other matter that may tend to collect therein.

The adapter 100 is maintained in position by a conical spring 118 that includes an end 120 overlapping the opening 108 and ensuring that the balls 116 do not fall through the opening 108. The spring 118 also holds the adapter 100 against the opening 102 through contact with the end of plug 104 adjacent to the first opening 110.

Thus it is apparent that there has been provided in accordance with the invention a pilot operated relief valve utilizing a two-stage, non-flow pilot which fully satisfied the objects, aims, and advantages set forth above. While the invention has been described in connection with a specific configuration and modifications, and variations will be apparent to those skilled in the art in light of the foregoing description. Accordingly, it is intended to embrace all such alternatives, modifications, and variations as fall within the spirit and broad scope of the following claims.

Therefore, I claim:

1. In a valve assembly including a two-stage pilot valve and a balanced main valve having a pressurized head volume, wherein said pilot and said main valve are in fluid communication through at least one conduit for venting said volume and operating said main valve, a tubular plug flow adapter mounted in said conduit comprising;

an axial conduit defined by said plug, said conduit having a first diameter and length;
at least one ball in said conduit having a diameter essentially less than said conduit first diameter, said ball and conduit defining an annular flow area;
means containing said ball within said conduit length, said means including first and second conduit openings, said first opening having an effective diameter less than said ball, and spring means for mounting said flow adapter in said conduit, said spring means including a spring portion positioned to partially obstruct the diameter of said second opening, thereby defining normal and relief positions of said ball at opposite ends of said conduit and within said first length;
wherein venting said main valve head volume moves said ball from normal to relief positions.

* * * * *